United States Patent [19]
Finzel et al.

[11] Patent Number: 5,206,927
[45] Date of Patent: Apr. 27, 1993

[54] CASSETTE AND CASSETTE BLOCK FOR LIGHT WAVEGUIDES

[75] Inventors: Lothar Finzel, Unterschleissheim; Thomas Ruckgaber, Munich; Winfried Lieber, Krailling, all of Fed. Rep. of Germany

[73] Assignee: Siemens Aktiengesellschaft, Munich, Fed. Rep. of Germany

[21] Appl. No.: 836,956

[22] Filed: Feb. 19, 1992

[30] Foreign Application Priority Data

Feb. 27, 1991 [DE] Fed. Rep. of Germany ....... 4106171

[51] Int. Cl.⁵ .................................................. G02B 6/36
[52] U.S. Cl. .................................................... 385/135
[58] Field of Search ......................................... 385/135

[56] References Cited

U.S. PATENT DOCUMENTS

| | | | |
|---|---|---|---|
| 4,770,357 | 9/1988 | Sander et al. | 242/54 R |
| 4,840,449 | 6/1989 | Ghandeharizodeh | 385/135 |
| 4,911,521 | 3/1990 | Kyuto et al. | 385/135 |
| 5,080,459 | 1/1992 | Wettengel et al. | 385/135 |

FOREIGN PATENT DOCUMENTS

| | | | |
|---|---|---|---|
| 3413401 | 10/1985 | Fed. Rep. of Germany. | |
| 2517077 | 5/1983 | France | 385/135 |
| 55-62414 | 10/1980 | Japan. | |
| 55-163508 | 12/1980 | Japan | 385/135 |
| 58-50508 | 3/1983 | Japan | 385/135 |
| 59-19914 | 2/1984 | Japan | 385/135 |

*Primary Examiner*—John D. Lee
*Assistant Examiner*—John Ngo
*Attorney, Agent, or Firm*—Hill, Steadman & Simpson

[57] ABSTRACT

A cassette which serves the purpose of connecting and branching light waveguides has a reserve length thereof for each of the waveguides deposited in the cassette in either a figure eight or circular or oval pattern. To accomplish this, the cassette is formed with upstanding holding devices which enable winding the waveguides in a figure eight pattern or in a circular pattern, or both. A plurality of the cassettes can be interconnected together to form a cassette block which can be opened hinge-like. To interconnect waveguides in one cassette with the other cassette, each of the cassettes is provided with an opening in a floor of the cassette and a portion of the side wall midway along the longitudinal side wall, which side wall is positioned adjacent a hinge interconnecting the cassettes together.

16 Claims, 3 Drawing Sheets

CASSETTE AND CASSETTE BLOCK FOR LIGHT WAVEGUIDES

BACKGROUND OF THE INVENTION

The present invention is directed to a cassette and to a cassette block for connecting and branching light waveguides. The light waveguides are joined by connector elements, such as splices, or by coupling elements, which can be couplers or splitters. What is referred to as the "reserve length" of the light waveguide is placed in the cassette.

A cassette for the acceptance of light waveguides is disclosed in German Published Application 34 13 401. As disclosed, two leads are tangentially conducted to the deposited light waveguides offset from the outside from the middle of the end face of the cassette, and the cassette has hold-down means to prevent the fibers from ascending or moving in a vertical direction. The reserve length of the light waveguides are usually only placed after the splice connection has been produced. When these reserve lengths are placed in circles or ovals, then the light waveguide is turned with every loop formed. When a plurality of loops are necessary, this leads to a high stress, which makes manipulation of the light waveguides more difficult and also lends to an increase in the attenuation.

Various solutions for avoiding this problem are known. A figure-eight-shaped deposit of light waveguides is disclosed by Japanese Published Application 55-62414.

The above two cassettes are actually more suitable for connecting light waveguides than for branching to a plurality of light waveguides and, accordingly, receive only two leads. A plurality of leads and a plurality of cassettes are often required when branching light waveguides via couplers. It is known per se to combine the plurality of cassettes to form a cassette block.

SUMMARY OF THE INVENTION

The object of the present invention is to provide a cassette and a cassette block for coupling and branching light waveguides.

To accomplish these goals, the present invention is directed to an improvement in a cassette for the acceptance of light waveguides, which can be joined to one another by at least one element selected from a group consisting of connector elements and coupling elements, and which waveguides can be deposited in deposit means in the shape of a figure eight. The improvements include that the deposit means are constructed so that the light waveguides can also be annularly deposited embracing only one-half of a figure eight, that the introduction openings for the connecting leads are provided and that the connecting leads are guided nearly tangential with the depositing light waveguides or outwardly displaced with reference thereto.

The combination of the figure-eight-shape and the annular deposit of the light waveguides is advantageous in the cassette of the invention. In accordance with the intended purpose, up to four leads can be guided into each cassette. Usually these leads include bundled leads or ribbons. Small radii of curvature that lead to the attenuation losses are avoided by the tangential entry of the leads or the entry with an even larger connecting radius. The nature of the deposit makes it possible to connect every light waveguide of a lead to every arbitrary light waveguide of one of the other leads. Reserve lengths having a multiple of the circumference of half of a figure eight can be circularly deposited. Given a change in the reserve length, for example due to another splice, it is adequate to shorten the reserve length by this circumference. By contrast to many other adequate to shorten the reserve length by this circumference. By contrast to many other cassettes, a plurality of light waveguides can be deposited.

It is advantageous when the figure eight formed of the deposited reserve length is composed of two ovals. These need not be tangential with one another in the point of contact, so that the deposited light waveguide can also intersect in the point of contact. The oval fashioning also enables a deposit of the reserve lengths that can deviate from the circumference of the oval in that they form an oval having a smaller longitudinal axis or form a circle.

It is advantageous when a plurality of connectors or, respectively, coupling elements are arranged along one side of the cassette. This arrangement guarantees adherence to the minimum bending radii in the guidance of the light waveguides. The mounting of the coupling elements can also occur outside of the cassette and the connector elements or splices and the coupling elements are always individually accessible.

An oblique entry of bundled leads is also advantageous. Since these must be partially conducted semi-circularly around the cassette, the patching space required for the leads in sleeves and racks is diminished by displacing a part of the semicircle into the cassette.

It is advantageous when a plurality of cassettes are combined to form a cassette block, wherein each cassette is hingeably connected to its neighboring cassette. Connecting lines having light waveguides can be conducted from one cassette into the other through recesses or openings in each cassette. As a result of the figure-eight-shaped deposit, the connecting lines between the cassettes can be conducted in both directions. A surveyable wiring is achieved given functionally interrelated cassettes. Easy access to every cassette of the cassette block and, thus, simple mounting and repair are possible due to the connection with hinges.

The wiring given branching is significantly simplified by openings or apertures in the cassette floor. When the connecting lines and the hinges are arranged in one plane, only a slight relative motion occurs when the cassettes are being hinged open. Up to now, corresponding light waveguides had to be conducted out of one cassette via cable introduction openings and had to be reintroduced into other cassettes via the introduction openings.

It is advantageous when the apertures or openings also cover part of the side wall. As a result thereof, the connecting lines can only slightly be stressed by bending when the cassettes are hinged open.

It is expedient when all coupling elements are provided in a cassette. A simple wiring occurs as a result thereof and no further operations need be performed on this cassette, given patching and connecting jobs.

Other advantages and features of the invention will be readily apparent from the following description of the preferred embodiments, the drawings and claims.

DESCRIPTION OF THE PREFERRED EMBODIMENTS

Figure 1:
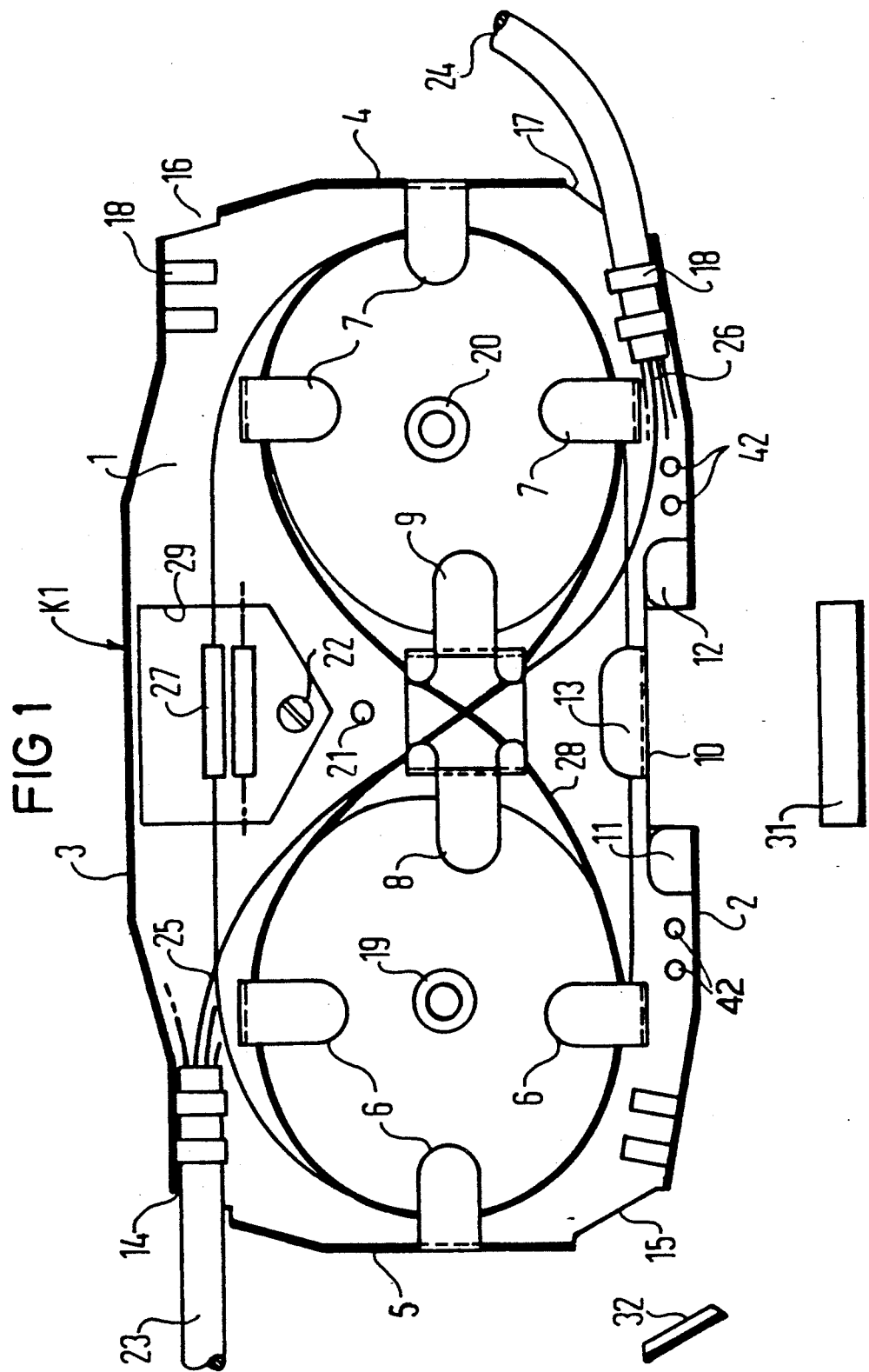
FIG. 1 is a plan view of a cassette according to the present invention.

The principles of the present invention are particularly useful when incorporated in a cassette, generally indicated at K1 in FIG. 1. The cassette K1 is composed of a cassette floor 1 with longitudinal side walls 2 and 3, as well as end walls 4 and 5. The cassette is lent the appearance of a flat, upwardly-opened box by the side walls.

Introduction openings 14–17 are positioned along each of the outside corners, with the majority of the opening being formed by a break-out part, such as 32, being removed from the end walls 4 and 5, respectively. The cables, such as 23 and 24, which may contain a bundle of leads, are inserted through the various openings 14–17 and are clamped to the cassette K1 by fastening devices, such as 18, which are positioned adjacent each of the openings. To hold each of the leads down and to form deposit means, hold-down means 6, 7, 8 and 9 are provided, with three hold-down means 6 coacting with the hold-down means 8 to form substantially a circle or oval around an opening 19 in the floor 1 of the cassette and the three hold-down means 7 coacting with the hold-down means 9 to form a second circumferential oval or circle around an opening 20 in the floor of the cassette. The hold-down means 8 and 9 coact together and are fashioned as one part. Each of the hold-down means has a web which extends substantially parallel to the cassette floor, which is mounted on an upstanding portion to space it from the floor. Each of the webs of the hold-down means 6, 7, 8 and 9 prevents the inserted light waveguides from raising up or moving too great a distance from the floor 1. The ovals prescribed by the hold-down means, such as 6 and 8 and 7 and 9, are arranged on the same axis so that the light waveguides, such as 25 and 26, can be deposited in the form of a figure eight by changing the direction from counter-clockwise to clockwise, as they move from one oval to the other.

With a plurality of webs, the central hold-down means 8 and 9 provide a fixing of the light waveguide sections that are annularly deposited, as well as of the light waveguide sections that are guided in the shape of a figure eight.

The term "annular" also covers circular, circle-like and oval deposits in this case. An additional hold-down means 13 is conceived for light waveguides proceeding around the figure eight deposit and is positioned adjacent a cutout or aperture 10 along one of the longitudinal side walls 2. The light waveguide proceeds over the connector elements only in exceptional cases. The hold-down means can be fashioned in the greatest variety of ways. Differing from what is shown here, the horizontal webs of the hold down means, such as 6 and 7, can also be pointed outward instead of being pointed inward toward the basic center of the oval, whereby the light waveguides must then be guided outwardly around the vertical parts of each of the hold-down means. The light waveguides can also be wound onto a cylinder-like structure, wherein the hold-down means will be formed by a disk that projects beyond the edge of the cylinder-like structure.

In FIG. 1, the longitudinal axes of the ovals are larger than their transverse axes. Longer, but narrow, cassettes will occur as a result of this structure. For reasons of clarity, only one light waveguide 25 and 26 is shown for each of the leads 23 and 24.

As a rule, however, the connecting leads or bundles contain a a plurality of light waveguides that can, likewise, be deposited in the cassette. The bundled leads can proceed tangentially vis-a-vis the light waveguide 28 deposited in the shape of a figure eight. In this exemplary embodiment, the connecting leads are displaced even further toward the outside. An entry curve having a larger radius will then merge into the smaller radius of the respectively ovals for each of the light waveguides.

The entry direction of the connecting lead 24 does not proceed parallel to the longitudinal axis of the cassette, but intersects it. The connecting lines are conducted through the side walls 2 and 3 and are fixed by the fastening device, such as 18. As a result thereof, the connecting lead 24 can be semi-circularly guided around the cassette with low space requirement. This is of significance for building the cassette into sleeves.

At least one connecting lead should be capable of being guided in this way at every end face of the cassette. The light waveguides are connected to one another by connector elements 27, which are splice elements, or coupling elements that branch from one light waveguide to a plurality of light waveguides. As a rule, a plurality of connecting elements 27 are present and are secured on a retainer 29 that is, in turn, secured to the cassette floor with a screw 22 adjacent one of the side walls, which is the side wall 3 of the present illustration. Due to the greater space required by the connector and the connecting elements, the deposit means 6, 7, 8 and 9 is offset vis-a-vis the center axis of the cassette.

As mentioned above, an opening or aperture is provided in the side wall 2 and, as illustrated, includes a portion of the floor 1. This recess 10 is formed by removing a break-away portion 31. Connecting lines can be conducted through this aperture 10. Ends of each of the apertures 10 are provided with hold-down means 11 and 12.

In addition to the above-described structure, the cassette cable also includes a connecting hole 21, which enables providing a cover for the cassette. Also, adjacent the side 2 are two pairs of holes 42, 42, whose purpose will be discussed hereinafter.

Figure 2:
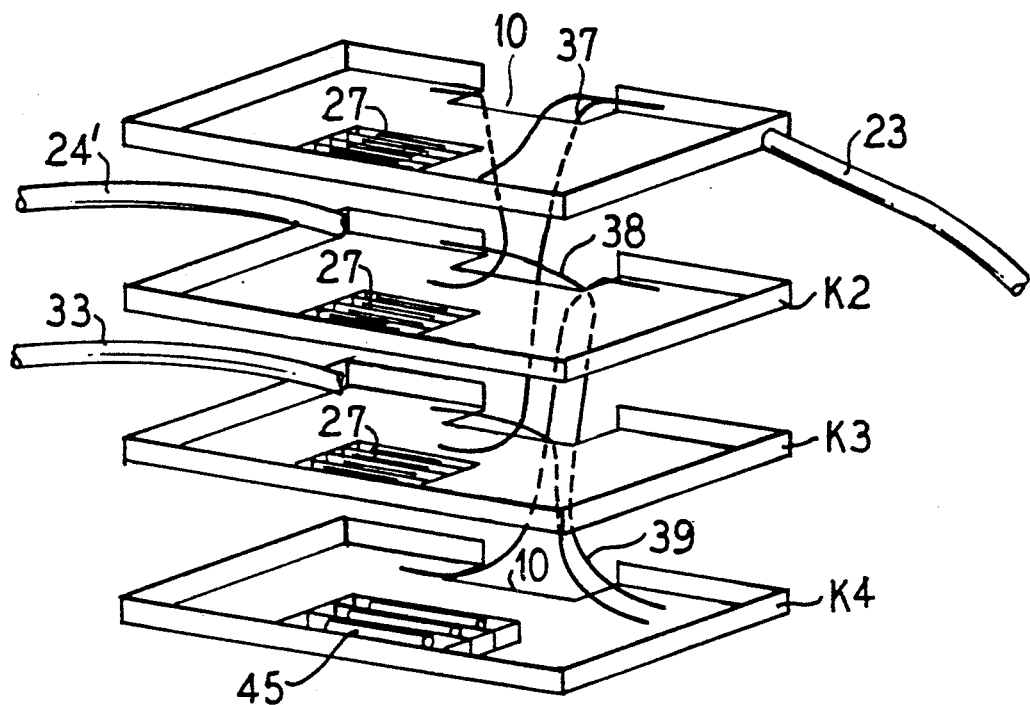
FIG. 2 is a schematic perspective view of a wiring of a cassette block.

The cassette can also be employed for branching light waveguides. To this end, couplers that each, respectively, have an input and a plurality of outputs are utilized. Couplers having a plurality of inputs can, likewise, be utilized. The plurality of cassettes, that are combined to form a cassette block, which has cassettes K1–K4 and is illustrated in FIG. 2, are required in order to realize the greater plurality of branchings. The connecting lines between cassettes K1–K4 are no longer conducted through the cable introduction openings, but through the openings 10. In order to respectively enhance the mechanical stability, a plurality of light waveguides are combined in protective hoses. These hoses can be helically slotted and can, thus, be simply placed over the light waveguides. Further hold-down means, such as 11 and 12, are provided for these connecting lines and their protective hoses are fixed, as provided in the cassette. For reasons of clarity, only connecting lines 37, 38 and 39 are shown in FIG. 2 and some of the following Figures. The additional hold-down means 13 will also prevent the collision between the light waveguides proceeding through the entire figure eight and the connecting lines, such as 37, 38 and 39.

Given a division or separation of light waveguides that are to be conducted in a cable 23, for example a plurality of cables in the uppermost cassette K1, one proceeds so that an especially beneficial wiring will occur. In the exemplary embodiment of FIG. 2, the incoming light waveguides are conducted to the coupling elements 45 that are arranged in the cassette K4 via connector elements, such as 27, that are arranged in the cassettes K1 and K3. The output of the coupling elements 45 are, in turn, connected to the outgoing waveguides of the connecting leads 24' and 33 via the connectors 27. Embodiments of the coupling elements can also be provided wherein the incoming and outgoing light waveguides are directly spliced, for example by welding. The connecting lines between the cassettes are conducted only through the apertures 10. It is, therefore, beneficial when only couplers 45 are provided in one cassette, such as K4, and when only connecting elements 27 are provided in the remaining cassettes of the cassette block. The outgoing connecting leads are referenced 24' and 33.

Figure 3:
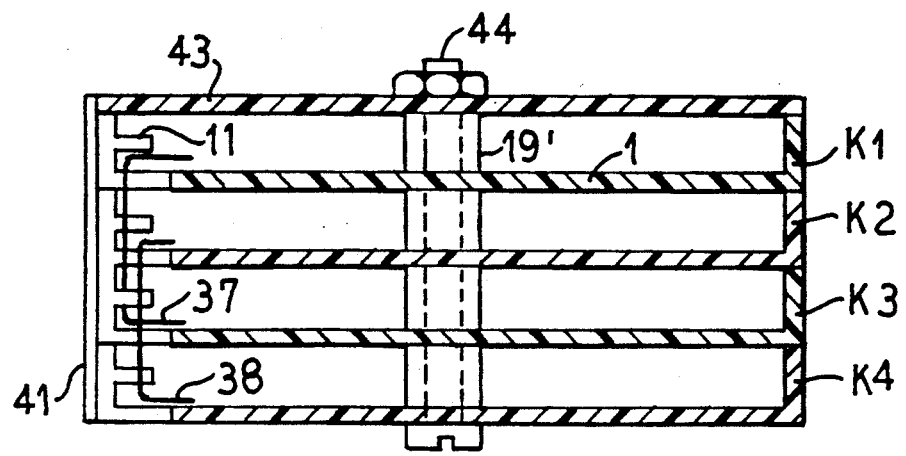
FIG. 3 is a cross sectional view taken through a cassette block in accordance with the present invention.

In FIG. 3, a section of the cassette block is illustrated, and the cassettes K1–K4 are held hingeably together in a book form by an articulated or hinge band 41, which is glued along one long side. They can be screwed to one another and to a carrier means with a screw-type connection, such as 44, which will extend through holes, such as 19 and 20 of FIG. 1. The uppermost cassette K1 can also be closed by a cover 43. It is noted that the holes, such as 19 and 20 have flanges (FIG. 1) extending from the base or floor 1 of the cassette. Flanges 19' (FIG. 3) act as spacing elements.

Figure 4:
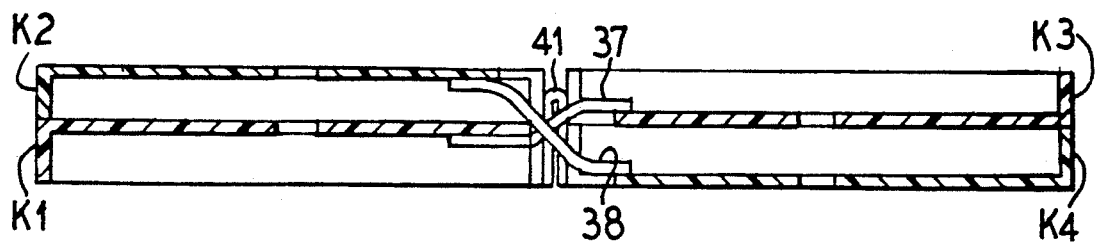
FIG. 4 is a cross sectional view illustrating a cassette block in a hinged-open condition.

To obtain access to one of the cassettes, such as K3, the screw-type connector 44 has been removed and the upper two cassettes K1 and K2 are folded to open relative to the lower cassettes K3 and K4 in a book manner, as illustrated in FIG. 4. The connecting lines, such as 37 and 38, that would proceed essentially transverse relative to the illustrated planes are only slightly stressed by the bending. Since the openings 10 also cover the longitudinal side parts 2 of the cassette, the connecting lines are only minimally bent.

Figure 5:
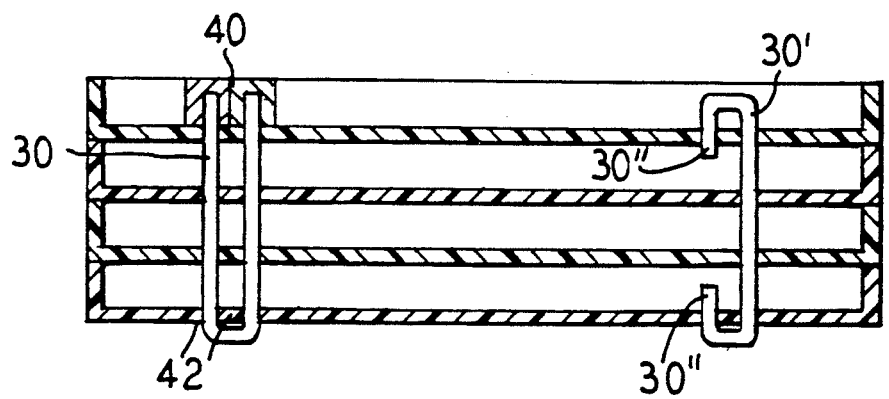
FIG. 5 is a cross sectional view of an embodiment of a hinge.

An alternate way of hingeably joining the cassettes is illustrated in FIG. 5. In this alternate embodiment, an elastic band or circular rubber, such as 30, is threaded through the spaced openings 42 to form a U-shaped member, as illustrated. The ends of this band can be connected by clamping means, such as 40. In another embodiment, this circular rubber 30' is clamped down by having ends 30" introduced into the second hinge opening, as illustrated.

Figure 6:
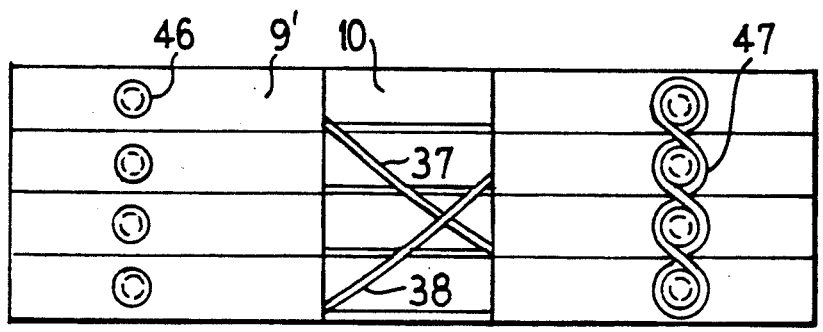
FIG. 6 is a side view of the cassette block in accordance with the present invention illustrating another modification of the interconnecting hinge.

Another possibility for hingeably joining is illustrated in FIG. 6. In this embodiment, the side walls 9' are provided with pegs 46, which have flat heads, and an elastic ring 47 is threaded around these pegs in a figure eight fashion to interconnect the various cassettes in the block.

Although various minor modifications may be suggested by those versed in the art, it should be understood that we wish to embody within the scope of the patent granted hereon all such modifications as reasonably and properly come within the scope of our contribution to the art.

We claim:

1. A cassette block comprising a plurality of cassettes for coupling and branching light waveguides, each cassette comprising a floor having a first longitudinal side wall, a second longitudinal side wall, and a pair of end walls upstanding from said floor, each cassette having deposit means for guiding light waveguides to enable them to be held in the shape of a figure eight configuration in the cassette and to enable them to be deposited in one half of the figure eight configuration, each cassette having first means for forming an opening adjacent each corner of the first and second longitudinal side walls for receiving incoming and outgoing leads, said first means supporting the lead adjacent the first longitudinal side wall to a extend obliquely to a center line of the cassette and outward of the deposit means and said first means supporting the lead adjacent the second longitudinal side wall to extend outwardly and longitudinally to the deposit means, each cassette having an opening mid-way along the first longitudinal side wall and a portion of the cassette floor adjacent thereto, and said cassette being joined together by a hinge positioned in the neighborhood of the first longitudinal side wall.

2. A cassette block according to claim 1, wherein connecting lines extend through the openings adjacent the first longitudinal side wall to enable passing waveguides between cassettes of the block.

3. A cassette block according to claim 1, wherein the hinge means is an elastic band extending through openings formed in the floor of the cassette adjacent said first longitudinal side wall.

4. A cassette block according to claim 1, wherein coupling elements are provided in only one of the cassettes and the remaining cassettes have connector elements.

5. A cassette block according to claim 1, wherein each of said openings adjacent the mid-point of the first longitudinal side wall is provided with hold-down means for holding connecting lines extending between the cassettes, and hold-down means for preventing waveguides from becoming entangled with said connecting lines.

6. A cassette block according to claim 5, wherein each of the cassettes have portions of the first longitudinal side wall adjacent the corner extending obliquely to form an angle with the center line of the cassette.

7. A cassette for the acceptance of light waveguides which are joined to one another by at least one element selected from a group consisting of a coupling element and a connector element, said cassette having a floor with a longitudinal first side wall, a longitudinal first side wall, a longitudinal second side walls, and a pair of end walls forming corners with the first and second side walls, said floor having deposit means for receiving and returning a wound waveguide, said deposit means being constructed to form a pair of ovals in line with each other to form a waveguide path with a shape of a figure eight to receive and retain the waveguide wound in a figure eight pattern and in a half of a figure eight pattern, said cassette having first means at each corner for forming an introduction opening for a lead having a light waveguide, a portion of the floor adjacent to a mid-point of the first side wall and a mid-region of the first side wall having second means for forming an access opening to enable passage of a waveguide through the floor, said first means at each corner of the first side wall supporting each lead to extend outwardly displaced with reference to the deposit means and obliquely to a center line of the cassette and the first means for the corners of the second side wall supporting the lead to extend longitudinally and outwardly relative to the deposit means.

8. A cassette according to claim 7, wherein the deposit means includes a plurality of hold-down means extending from the floor of the cassette to shape the light waveguides and hold the light waveguides parallel to the cassette floor.

9. A cassette according to claim 8, wherein additional hold-down means are provided adjacent the access opening.

10. A cassette according to claim 7, wherein the means for forming introduction openings includes break-away portions.

11. A cassette according to claim 7, which cassette includes means forming a hinge for interconnecting a plurality of cassettes to form a cassette block.

12. A cassette according to claim 7, wherein each of the first means and the second means include a break-away portion.

13. A cassette according to claim 12, wherein the deposit means includes a plurality of hold-down means extending from the floor of the cassette to shape the light waveguides and hold the light waveguides parallel to said floor.

14. A cassette according to claim 13, which includes a mount for receiving each element, said mount being positioned on the floor adjacent a mid-point of the second side wall.

15. A cassette according to claim 14, which includes means for forming a hinge for interconnecting a plurality of cassettes to form a cassette block.

16. A cassette according to claim 7, which includes a mount for receiving elements selected from connector elements and coupling elements, said mount being positioned adjacent the second side wall of the cassette.

* * * * *